United States Patent
Monsalve-Gonzalez et al.

(10) Patent No.: US 6,899,907 B1
(45) Date of Patent: May 31, 2005

(54) BLEACH BRAN AND BRAN PRODUCTS

(75) Inventors: Adelmo Monsalve-Gonzalez, Plymouth, MN (US); Lloyd E. Metzger, Champlin, MN (US); Aruna Prakash, Plymouth, MN (US); Mayur Subhash Valanju, Brookfield, WI (US); John G. Roufs, Maple Grove, MN (US)

(73) Assignee: General Mills, Inc., Golden Valley, MN (US)

( * ) Notice: Subject to any disclaimer, the term of this patent is extended or adjusted under 35 U.S.C. 154(b) by 0 days.

(21) Appl. No.: 09/663,914

(22) Filed: Sep. 18, 2000

(51) Int. Cl.$^7$ ............................................... A23L 1/277
(52) U.S. Cl. ........................ 426/253; 426/254; 426/255; 426/258; 426/262; 426/549; 426/615
(58) Field of Search ................................ 426/253, 254, 426/255, 258, 262, 549, 615

(56) References Cited

U.S. PATENT DOCUMENTS

| | | |
|---|---|---|
| 250,436 A | 12/1881 | Gathman |
| 4,649,113 A | 3/1987 | Gould |
| 4,774,098 A | 9/1988 | Gould et al. ................ 426/549 |
| 4,806,475 A | 2/1989 | Gould ........................ 435/165 |
| 4,844,924 A * | 7/1989 | Stanley ...................... 426/258 |
| 4,919,952 A | 4/1990 | Sadaranganey et al. |
| 4,997,488 A | 3/1991 | Gould et al. ................. 127/37 |
| 5,023,103 A | 6/1991 | Ramaswamy ............... 426/626 |
| 5,089,282 A | 2/1992 | Wellman |
| 5,190,669 A | 3/1993 | Wiebel |
| 5,219,601 A | 6/1993 | Devic |
| 5,275,833 A * | 1/1994 | Schmidt ..................... 426/253 |
| 5,391,389 A | 2/1995 | George et al. |
| 5,480,788 A | 1/1996 | Devic ........................ 435/168 |
| 5,773,066 A | 6/1998 | Satake et al. ............... 426/483 |
| 5,871,800 A | 2/1999 | George et al. |

FOREIGN PATENT DOCUMENTS

| | | | |
|---|---|---|---|
| DE | 201 246 A | 7/1983 | |
| DE | 201246 | 7/1983 | .......... A21D/13/00 |
| JP | 52-139748 A | 11/1977 | |
| JP | 53-072852 A | 6/1978 | |
| JP | 54-143544 A | 11/1979 | |
| WO | WO 92/08842 A | 5/1992 | |
| WO | WO 96/25862 | 8/1996 | |
| WO | WO 01/17373 A | 3/2001 | |

OTHER PUBLICATIONS

Rombauer, I. S., et al., *Joy of Cooking*, The Bobbs–Merrill Co., Inc.,(1975), p. 150.

Hoseney, R.C., "Principals of Cereal Science and Technology", *American Association of Cereal Chemists*, 4 pages, (1986).

Hoseney, C.R. 1994 *Principles of Cereal Science and Technology* $2^{nd}$ Ed., pp. 130–131.

Anderson et al., 1980 *An analysis of dietary fiber content of a standard wheat bran*, 336–340.

Ramulu et al. 1997 *Effect of processing on dietary fiber content of cereals and pulses*, 249–257.

* cited by examiner

Primary Examiner—Lien Tran
(74) Attorney, Agent, or Firm—John A. O'Toole; Barbara L. Clark; Douglas J. Taylor

(57) ABSTRACT

A method of bleaching bran, comprising treating bran with a hydrogen peroxide solution to produce lightened bran having fewer native flavor components is disclosed. In one embodiment, a bleached bran product suitable for admixing with whole wheat flour to produce white whole wheat flour having an "L" value on the Hunter scale of at least about 75 is disclosed. In one embodiment, cleaned bran is treated with a solution of chelating agents to remove or inactivate transition metals. Thereafter, exposure to oxidant substances, such as hydrogen peroxide, ozone, and so forth, in the presence of an alkaline compound produces bleached bran, which can be washed and dried for use in products such as flours, pastas, and so forth.

4 Claims, 1 Drawing Sheet

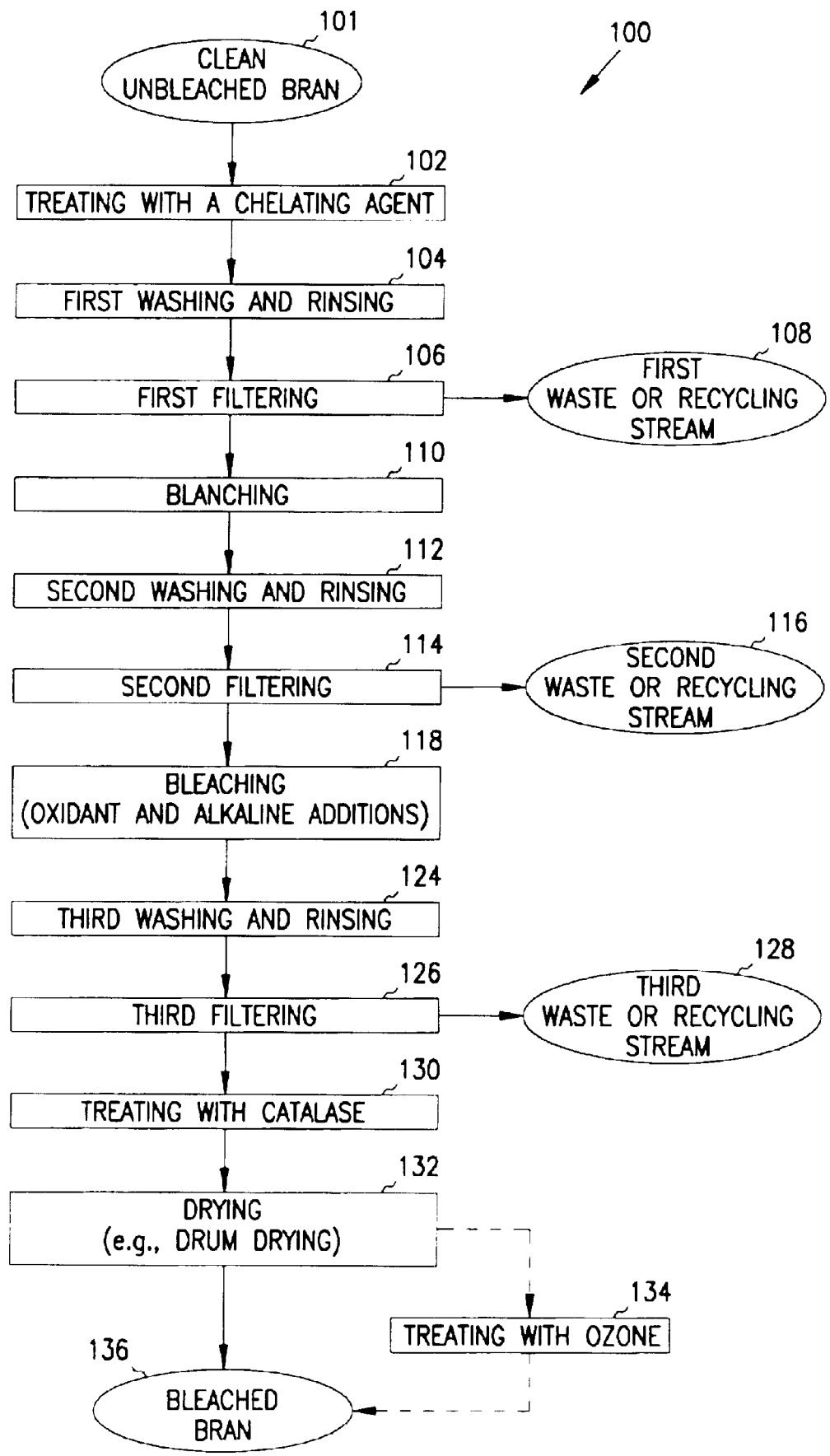

BLEACH BRAN AND BRAN PRODUCTS

FIELD

The present invention relates to bleached grains and in particular to bleached brans.

BACKGROUND

Whole grain products are known to be rich in dietary fiber and other nutrients. Although there are many health benefits associated with the consumption of whole grain products, many consumers avoid such products due to the relatively poor taste and color associated with whole wheat flours. This is especially true of children, who can be particularly selective in food choices.

Attempts to overcome these problems include use of ground-up white wheat rather than red wheat in an attempt to mask or reduce the bitter taste of the bran. However, the flour produced with these methods still has a bitter flavor and yields a baked product with a dark color.

It is generally believed that the presence of bran is a major cause of the taste and color problems associated with whole wheat flours. Bran contains phenolic compounds, which may be responsible for the bitter and astringent taste. Certain phenolic compounds, such as tannins, can impart a brown or even grayish color to flour, particularly flours made from red %% heat. Thus, conventional processes used to produce non-whole wheat or white products attempt to remove as much bran as possible during milling, although this is also removing a key nutritional component of the kernel. Specifically, bran not only contains fiber, but other healthy components that are known to be useful in preventing cancer, such as colon cancer.

Thus, there is a continuing need for whole wheat flours that can be used to provide finished whole wheat products that look and taste as good as those made with "regular" white flour. Also, there is a continuing need for bran products that are useful for addition to regular white or patent flour for the purpose of providing whole grain flours that are comparable to patent or white flours in taste, appearance and baking qualities, notwithstanding the presence of added bran in the flours.

SUMMARY

A method of bleaching bran, comprising treating bran with a hydrogen peroxide ($H_2O_2$) solution to produce lightened bran having fewer native flavor components is disclosed. In one embodiment, a bleached bran product suitable for admixing with wheat flour to produce white whole wheat flour having an "L" value on the Hunter scale of at least about 75 is disclosed.

The present invention provides a chemical lightening treatment or wetting process, or wet bleaching process that bleaches the bran portion of wheat kernels after cleaning and milling to produce a bleached bran without the bitter aftertaste normally associated with whole grain products. This is unlike conventional white grain processes that seek removal of bran in order to provide a product without a bitter taste. Bleaching only the bran portion of the wheat instead of the entire kernel also eliminates any potentially negative effects on flour functionality caused by bleaching an intact kernel.

In one embodiment, the present invention provides an intermediate bleached bran product. In another embodiment, a white whole grain flour having a high fiber content (10 to 12%) and other nutritional advantages of a whole grain flour that nonetheless has a white color and bland flavor comparable to conventional white flour is provided. The white whole grain flour comprises a conventional flour and fortifying amounts of the intermediate bleached bran product.

In one embodiment, cleaned bran is treated with a solution of chelating agents to remove or inactivate transition metals. This is followed by a blanching or heat treatment step to inactivate indigenous catalase enzymes. Thereafter, exposure to oxidant substances, such as hydrogen peroxide, ozone, and so forth, in the presence of an alkaline compound produces bleached bran, which can be washed and dried for use in products such as flours, pastas, cereals, cereal bars, functional foods, and so forth.

In a specific embodiment, bran is heated with a 600 PPM EDTA solution at a temperature of about 70 to 90° C. for about five (5) minutes and then washed with deionized water. About 18 ml of about 30% hydrogen peroxide is added for every 50 grams of bran. A sufficient amount of sodium hydroxide is added to raise the pH to about 9–9.5 so that the hydrogen peroxide can bleach the bran. In one embodiment, the blanched bran is bleached at about 122° C. at a pressure of about 103.4 kilopascal (kPA) or one (1) atm (i.e., about 15 psi) for approximately two (2) minutes. In another variation, the blanched bran is processed at atmospheric pressure at about 80° C. for about 40 to 60 minutes. The resulting product is washed thoroughly with water and then filtered. The bleached wet bran is then dried, such as in a rotating drum, at about 276 kPA (40 psi). The final product still contains a sufficient amount of water so as to be utilized in any number of end products, such as flours, pasta, and so forth.

Flours comprising this bran exhibit minimal or no enzyme activity, such as polyphenoloxidase and lipoxygenase activity, which helps to increase flour stability, particularly as it relates to rancidity during storage. Another benefit is the white appearance of composite flours utilizing the bleached bran, as the "L" value on the Hunter scale can be in excess of 90. The water absorption of the bleached bran is also increased by up to six times in comparison to unbleached bran, which provides baking advantages known in the art. The antioxidant activity in the bleached bran is also increased by at least 15 to 20%, up to 30–35% or more, as compared with unbleached bran, which is thought to have significant health benefits.

These and other features, aspects and advantages of the present invention will become better understood with regard to the following description, appended claims and accompanying drawings.

BRIEF DESCRIPTION OF THE DRAWINGS

The FIGURE is a flow diagram showing a process for bleaching bran in one embodiment of the present invention.

DETAILED DESCRIPTION OF INVENTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that mechanical, procedural and system changes may be made without departing from the spirit and scope of the present invention. The following detailed description is, therefore, not to be taken in a limiting sense, and the scope of the present invention is defined by the appended claims and their equivalents.

Bleached bran, bran products, improved flours fortified with the bran products herein and methods of preparation are disclosed. A brief background on wheat and milling is given first, followed by a description of various methods of producing bleached bran as well as a description of the resulting bleached bran and bran products.

Wheat and Milling Background

The principle species of wheat are *Triticum aestivum* or bread wheat; *T. durum* which has extra hard kernels used primarily for macaroni and related pasta products; and *T. compactum* or club wheat, which has very soft kernels. Numerous varieties and cultivars within each species are known.

In the United States, wheat is classified according to whether it is hard or soft, white or red, and winter or spring. As a result there are eight possible designations including: hard white spring, hard red spring, hard white winter, hard red winter, soft white spring, soft red spring, soft white winter, and soft red winter.

The white or red designation refers to the color of the wheat kernel. Currently, red wheat is more readily available in the United States than white wheat. As noted above, red wheat has a distinctive taste due to the presence of high levels of catechin and catechin tannins in the bran.

The hard or soft designation refers to protein strength and content of the wheat kernel. Tannin content is also known to be lower in soft wheat than hard wheat.

The winter or spring designation refers to the growth habitat of the wheat. Winter wheat is planted in the fall and harvested in the spring, whereas spring wheat is planted in the spring and harvested later that same crop year.

Wheat comprises a major starchy endosperm, a smaller germ or sprouting section of the seed and a surrounding bran or husk layer. The "endosperm" is the portion typically referred to, upon milling, as "flour" and generally makes up about 81–85% of the wheat kernel. Bran makes up about 11–15% of the kernel, with about one (1) to 3.5% being the germ portion. Bran with or without the germ is sometimes referred to as "mill feed." Mill feed is a low value commodity typically used for animal feed.

Wheat milling is a mechanical method of breaking open the wheat kernel to remove as much endosperm as possible from the bran and to grind or reduce the endosperm into flour. The process substantially separates the major components of the wheat. Conventional whole wheat flour is produced by grounding "sound" wheat, i.e., wheat that is substantially free of disease or other defects, other than durum. The proportion of natural constituents, other than moisture, remain similar to the intact wheat kernel. Conventional white flour is produced when most of the bran is also separated from the endosperm. The gem fraction is usually separated from the rest of the kernel because its fat content limits the shelf life of the flour. However, some special purpose whole grain flours include not only the bran but also the germ fraction. The yield of flour or endosperm from milling is typically about 70–80%, with the remaining endosperm still present in the bran.

The bran portion can vary considerably in starch and fiber content. "Light" bran contains 10 to 20% starch and has a fiber content of about 38 to 48%. "Heavy" bran contains more than 20%, up to 30% starch, and has a fiber content of between about 25 to 35%. "Native" bran refers to non-treated bran, i.e. bran that has not been subjected to any chemical or physical treatment that may affect its dietary fiber content.

Wheat color is measured using a calorimeter that uses either the CIE system or the triestimulus Hunter system. The Hunter value "L" denotes lightness, the "a" value denotes redness or greenness and the "b" value yellowness or blueness. A perfect white in the triestimulus scale has the following values: L=100, a=0 and b=0. Light bran obtained from winter soft wheat has an approximate triestimulus value range of L=70–74, a=4–5 and b=18–22. The latter parameters depend on crop year, location and growing conditions. Further discussion of the various types of wheats is found in the Application entitled, "Bleached Grain and Grain Products and Methods of Preparation," Ser. No. 09/392,699, filed 9/9/2000, commonly assigned, which is hereby incorporated by reference in its entirety.

Flour milling is a low margin commodity operation. As a result, even small increases in the extraction or mill feed ingredients can dramatically and disproportionately affect the profitability of a milling operation.

Bleached Bran Processes

The starting material can be any type of wheat, although a whiter final product is obtained with a whiter starting material, such as a white wheat. For this reason, white wheat bran is the preferred starting material. In one embodiment, a soft white wheat is used as the starting material. In another embodiment, red wheat is used as the starting material. The wheat is cleaned and milled in any suitable manner known in the art to produce wheat bran. In one embodiment, "light" bran from winter soft white wheat is produced and used in the process. As noted above, milling does not completely separate the components. As a result, the wheat bran can contain wheat germ in amounts up to about 20 percent or more, and the starchy endosperm content can be about 15 to 30%, depending on type. Generally, higher amounts of starch require more reagents for removal, thus increasing costs.

The bran can be any suitable particle size, such as 100 microns or more. Although bran with a smaller particle size can be used, there is a tendency towards clumping during the process when the bran particle size is less than about 100 microns. In one embodiment, the bran is ground prior to the bleaching process to produce a ground bran having a particle size ranging from about one (1) to 40 microns. In another embodiment, the bran is ground during or at the end of the bleaching process. In yet another embodiment, the bran is not further ground after milling.

In the embodiment shown in the FIGURE, the bran-bleaching process 100 begins when unbleached bran 101 is treated 102 with a chelating agent in order to substantially inactivate or remove transition metals present in the bran. Such metals include, but are not limited to, manganese, copper and iron. This is important because active transition metals can decompose bleaching agents, such as hydrogen peroxide. Since milling is a commodity process, small increases in the efficiency of peroxide utilization are important to obtaining commercially practical methods.

The chelating agent needs to be present for a sufficient time and at a sufficiently high temperature in order to minimize the effect of the transition metals. In one embodiment, the chelating process is relatively rapid, taking only about one (1) to 15 minutes at a temperature of about 70 to 90° C. In another embodiment, the process takes less than about one (1) minute. In yet another embodiment, the process takes between about one (1) to two (2) minutes to complete at a temperature of about 80° C.

Any suitable type of transition metal sequestering components, i.e., chelating agents, can be used. This includes, but is not limited to, any orthophosphate, metaphosphate, pyrophosphate (e.g., tetra sodium pyrophosphate), polyphosphate, 1,2, diaminoethane, ethylenediaminetetraacedic acid (EDTA), and so forth. The EDTA can be in the form of calcium EDTA or sodium EDTA. With the exception of EDTA, the chelating agent can be present in any suitable concentration, such as between about one (1) to two (2)%. Generally, higher concentrations of chelating agents remove more metals, although the upper level is generally limited by good manufacturing practices. However, since end-product levels of EDTA are mandated by the U.S. government, EDTA is typically added at much lower concentrations, such as between about 0.02 to 0.1% (200 to 1000 PPM) in solution with water.

In one embodiment, the mixture of bran and chelating agent solution contains about 30% solids and about 70% liquids, by weight. In a specific embodiment, about 45.4 kg (100 lbs) of bran is mixed at ambient temperature with a liquid solution of 0.06% EDTA weighing about 106 kg (233 lbs).

The treated bran is then washed and rinsed in a first washing and rinsing step 104 as shown in the FIGURE. In this step, water is used to partially rinse away the chelate transition metal that has combined with the chelating agent. Preferably, the water is soft water with low levels of iron (less than about five (5) PPM), manganese (less than about 0.02 PPM) and copper (less than about 0.02 PPM). (Soft water is generally defined as water having less than about two (2) grains of hardness (calcium and magnesium) per gallon). In one embodiment, distilled or deionized water is used. Washing can be accomplished with a suitable amount of agitation. Rinsing can also be accomplished by any suitable means, such as with a combination of agitation and spraying. The resulting washed bran is filtered or dewatered in a first filtering step 106 by any suitable means, such as with centrifugation mechanical pressing or low-pressure extrusion. The water (waste or recycle) stream 108 containing the chelating agent can be recycled for use again in the process or discarded, as desired. In one embodiment, there is no first washing and rinsing step 104 or first filtration step 106, although empirically, it is believed that washing also serves to remove some of the soluble bitter-flavor components.

The washed bran is then blanched or heat-treated in a blanching step 110 to inactivate indigenous catalase and peroxidase enzymatic systems (known as hydroperoxidases) that can otherwise detrimentally affect the activity of the hydrogen peroxide by decomposing it into hydrogen and oxygen, which can cause foaming. Peroxidase is a heat stable indicator enzyme, i.e., once the peroxidase is inactivated, most other enzymes have also been inactivated. In one embodiment, the blanching step 108 is performed at a temperature of about 75 to 85° C. for three (3) to ten (10) minutes, although the invention is not so limited.

Residual catalase enzymatic activity can be measured by any suitable method. In one embodiment, a qualitative method is used in which a small amount of hydrogen peroxide solution is added and a visual determination is made as to the formation of bubbles. The presence of bubbles indicate that oxygen is being evolved, i.e., peroxide decomposition. If no bubbles are present, the process proceeds to the bleaching step 118 described below.

In one embodiment, about 99% of the enzyme activity is destroyed in the blanching step 110. In another embodiment, residual enzyme activity is below about ten (10) CIU/g bran (catalase international units). CIU refers to the amount of enzyme in grams that catalyses the decomposition of one (1) micromole of hydrogen peroxide per minute.

The washed and blanched bran is then washed in a second washing and rinsing step 112 as shown in the FIGURE, which can be followed by a second filtering step 114 that has an associated waste or recycling stream 116. Preferably, water having a low metal content is used for the second washing and rinsing step 112. In one embodiment, soft water, as described above, is used. These steps, 114 and 116, also help to reduce the transition metals that still may be present. In one embodiment there is no second washing and rinsing step 112 or second filtering step 114, although again, it is thought that by providing one or more washing, rinsing and filtering steps at some point in the process, an added benefit can be achieved, i.e., removal of certain undesirable soluble bitter flavor components.

At this point, between about 40 to 60% of the manganese, about 50% of the copper, and about 10 to 20% of the iron have been removed or inactivated. In another embodiment, more than 60% of the manganese, more than 50% of the copper, more than 20% of the iron, as well as amounts of other transition metals, have been removed or inactivated. In a specific embodiment, the resulting material has less than about six (6) PPM copper, less than about one (1) PPM of manganese, and less than about ten (10) PPM of iron. As a consequence of the washing steps 104 and 112, starch is also removed. In one embodiment, the amount of starch is reduced after two washing steps from about 19–20% to less than about three (3) %, by weight.

The FIGURE further indicates that the present process 100 also essentially comprises a step 118 of bleaching the washed and blanched bran. In the bleaching step 118, the wet bran is treated with an oxidant substance, such as hydrogen peroxide, ozone, and/or peracetic acid in the presence of heat. In one embodiment, concentrated hydrogen peroxide, such as about six (6) to 40% hydrogen peroxide, is added to the wet bran. Since concentrated peroxide is less stable at elevated temperatures, it is preferably stored as cold liquid at a temperature of about −25 to 5° C. and then added to the bran at a temperature no higher than room temperature to avoid increased spontaneous decomposition. More dilute peroxide can also be used, although such a process is less efficient.

The amount of oxidant employed depends upon a variety of processing parameters and desired level of bleaching. In order to keep costs down, the minimum amount required to accomplish the desired level of bleaching is generally used. In one embodiment, about one (1) to 20 parts of hydrogen peroxide to about 100 parts of bran (dry basis) is used. In preferred embodiments, the peroxide utilization rates range from about 1 to 5 parts of hydrogen peroxide per 100 parts bran.

Since the pH of hydrogen peroxide is about 6 to 6.7, it does not react readily with the bran. As a result, it is necessary to add an alkaline substance, such as sodium hydroxide, potassium hydroxide or alkaline salts, i.e., sodium carbonate or polyphosphates, i.e., trisodium phosphate, to increase the initial pH for the bleaching reaction to about 9 to 9.5 (at room temperature). The alkaline solution can have a concentration in excess of about one (1)% up to about ten (10)% or more. In one embodiment, an aqueous alkaline solution is added in amounts of about 10 to 15 parts (dry weight) of alkaline material per 100 parts bran. In one embodiment, the bran is treated with the alkaline and oxidant solution simultaneously. In another embodiment, the solutions are added sequentially. In yet another embodiment, no alkaline solution is added. Further optimization of the process can be achieved by measuring pH changes throughout the bleaching process. In this way, pH values can be corrected based on known dependence of pH on temperature.

The bleaching step 118 is carried out at elevated temperatures. In one embodiment, the bran is bleached by "heating" it with a concentrated hydrogen peroxide solution, together with sodium hydroxide at atmospheric pressure and a temperature of between about 80–90° C. for about 20 to 60 minutes. In another embodiment, the bleached bran is subjected to a high-pressure treatment at a pressure of about 83 to 124 kPA (12 to 18 psi) for about one (1) to five (5) minutes at a temperature of 120–130° C. In a specific embodiment, the bran is bleached for about two minutes at a pressure of approximately 103.4 kPA (15 psi) and temperature of about 122° C. However, operating the process at elevated pressure requires a special pressurized vessel with suitable relief valves to avoid build-up of excess pressure. In one embodiment, about three (3) to 10% pure hydrogen peroxide per 100 g of dry gram of dry bran is used. In a specific embodiment, a mixture of about 10% peroxide solution and one (1)% alkaline solution is heated together with the bran to about 85° C. for about four (4) to five (5) minutes under atmospheric conditions. Use of peroxide in the bleaching process is advantageous in that it degrades into harmless oxygen and water. In contrast, other types of bleaching techniques such as those that employ chlorine or benzoyl peroxide, can result in either undesirable modification of the functional properties of a finished flour in which the bleached bran is used or undesirably high concentrations of residual bleaching agents or both.

The peroxide can be sprayed onto the bran or the bran can be soaked in a heated bath of peroxide. In one embodiment, a peroxide stabilizing agent, such as about one (1)% sodium silicate and/or magnesium sulfate (about 0.1% is used.

The bleached mixture can then be subjected to a third washing and rinsing step 124, followed by a third filtering step 126 with its associated waste or recycling stream 128 shown in FIG. 1. Any suitable type of water can be used to wash and rinse the bran, such as "soft" water as described above. These latter steps remove most of the oxidant, although some residual oxidant does remain. For example, if 10% hydrogen peroxide is used, the residual after bleaching can be as high as two (2) to three (3) percent. By providing a washing and rinsing step 124 followed by a filtering step 126 at this point in the process, it is possible to reduce the concentration of hydrogen peroxide to less than about 0.5%. It may be possible to omit the step of washing, rinsing and filtering the bleached bran in those embodiments where residual hydrogen peroxide is relatively low, such as less than about one (1)% by weight. However, higher residual concentrations of hydrogen peroxide can result in foaming, which can cause a number of problems, such as, overflow in the system, development of excessively-high pressure, and so forth. Providing at least one washing step is generally recommended in the process of the present invention, as it appears to provide the side benefit of removing certain soluble bitter flavor components.

The resulting bleached bran product is treated 130 with a suitable amount of catalase in order to destroy any remaining oxidant, such as the hydrogen peroxide. In one embodiment, a commercial preparation of catalase, such as the one obtained from the fungi *Aspergillus nigers*, is used. In a particular embodiment, between about 0.1 and 0.4% of catalase, by weight, of bran, is added at an operating temperature of about 55 to 65° C. In one embodiment, the operating temperature is about 60° C. In this step, the oxidizing compound can be reduced to less than about five (5) PPM such that the bleached bran is substantially free of hydrogen peroxide.

The catalased bran can be dried 132 at this point or first treated with ozone 134 as shown in the FIGURE. Treatment with ozone further whitens the bran, and offers a low cost option to further treat the bleached bran, if desired. However, in most instances, the bran is bleached sufficiently for use in most desired applications. In one embodiment, whiteness of the bleached bran is improved by treating the bran with 0.1% to two (2)% ozone, by weight, at pH 4–5. In this embodiment, ozone is generated in an ozone generator and the bran is treated in an enclosed system or vessel that keeps the ozone and the low-pH bran in intimate contact. The consistency of the bran can vary from about 20 to 40%, depending on water retention. Mixing of the ozone and bran can be accomplished by any means known in the art, such as by mechanical means (e.g., tumbling device, rotary device with mixing blades, etc). In one embodiment, the reaction of ozone and bran is in the range of about 90 to 95%, e.g., for about 100 g of incoming ozone, only about ten (10) g of ozone exits the reaction vessel or system.

Any suitable type of drying method can be used, such as high pressure drying, air drying, freeze drying and so forth. The final product, i.e., (dried) bleached bran 134, is preferably dried sufficiently so that there are about five (5) to 13 grams of water per 100 grams of dry bran. In one embodiment, the bran is ground from a particle size of about 500 microns to a particle size of less than about 100 microns, such as about 40 to 50 microns. For embodiments in which EDTA has been used as the chelating agent, the residual EDTA level in the bleached bran is less than about 100 PPM, and may be much lower. In one embodiment, the treated bran has a pH of between about six (6) and seven (7), such as about 6.7.

By treating the bran and germ separately from the rest of the wheat kernel as described herein, an increase in flour functionality, particularly baking functionality, is obtained at a reduced cost. Further, since gluten-forming proteins are not present in the bran, the bleaching process can occur at higher temperatures as compared with the whole kernel bleaching as described in application Ser. No. 09/392,699, noted above. This is advantageous as bleaching action is facilitated by heat, although temperatures in excess of 85 to 90° C. are generally not used since competing reactions, such as browning can begin to occur at higher temperatures.

In an alternative embodiment, many of the corresponding process steps as described in application (Ser. No. 09/392, 699), can be applied to clean bran, with modifications where appropriate, due to the differences between utilizing bran versus whole kernels.

Those skilled in the art will recognize that the equipment used in the above-described process can be any conventional equipment typically utilized for the particular steps. In one embodiment, a drum dryer operating at about 207 to 345 kPA (30 to 50 psi), such as about 276 kPA (40 psi), is used in the drying step 132. Drum drying provides a quick and economic method for drying the bran.

In another embodiment an extruder is used for the bleaching and catalase addition steps, 118 and 130, respectively, together with an additional cool-down step. The third washing and rinsing step 124 as well as the third filtering step 126 is performed outside of the extruder in this embodiment. Use of an extruder allows the process to be run in a continuous manner rather than as a batch process. Further, there is more control over temperature and pressure, since excess steam can easily be vacuumed off.

Bleached Bran and Bleached Bran Products

The resulting bleached bran can vary from a light red to a yellow color, but is visibly lighter than untreated or unbleached bran. The final bran color is controlled by a combination of factors, including, but not limited to, the proportion of oxidant in the suspension, processing temperature, pH of suspension, processing pressure and processing time. For example, if the pH and temperature are too high, too much browning may occur. High temperatures may also promote the development of off-flavors. However, if the temperature is too low, the efficiency of the bleaching process decreases. Use of increased amounts of oxidant produces a whiter product, but increases the costs as well. There is also typically an optimum amount of time for the bleaching step (118) to operate, depending on the pressure conditions as noted above. Exceeding this time can be detrimental to the dietary fiber content of the end product.

Unbleached bran made from white wheat typically has an L value on the Hunter scale of about 72 to 73. The bleached bran of the present invention has a higher L value than unbleached native bran. In one embodiment, the L value is greater than about 75. In another embodiment, the L value of the bleached bran is between about 82 and 93. In a particular embodiment, about five (5)% bleached bran, by weight, having an L value of about 84 is added to an all-purpose whole wheat flour having an L value of about 93.3. The resulting composite flour in this instance has an L value of about 92.4. In other embodiments, the composite flour can have an L value of between about 82 and 93.

In comparison, a typical whole wheat flour produced by conventional methods that contains native or unbleached bran can have an L value of about 80 to 84. In one embodiment, flour combined with "drum-dried" bleached bran produced according to one of the processes of the present invention has an L value of about 85.2. In another embodiment, flour combined with "freeze-dried" bleached bran produced according to one of the processes of the present invention has an L value of about 92.5. This compares favorably with typical all-purpose white flour, which has an L value of about 93.

It should be noted that typical white flour is usually "bleached" using a combination of chlorine, benzoyl peroxide and/or azodicarbonamide. These oxidants exert their action by oxidizing the carotenoid pigments that give the yellow color to flour. However, conventional bleaching processes do not easily oxidize the components in bran that are responsible for the brown coloring, e.g., such as lignin and other polyphenols. As such, oxidants such as chlorine, benzyl peroxide and azodicarbonamide would not be suitable oxidants in the processes of this invention. Furthermore, chlorine bleached white flour is undesirable in many countries and not used. As a result, most baked goods outside the United States do not have as light a texture, i.e., they are much denser. Ongoing attempts to improve functionality in these products include use of unbleached white flour, heat-treated white flour, bleached white flour and/or mixtures thereof.

In addition, the anti-oxidant activity of the bleached bran is increased significantly by the alkaline treatment with hydrogen peroxide. Specifically, the bran contains an aleurone layer that is relatively high in phenolic compounds, including ferulic acid. While not wishing to be bound by the proposed theory, it is speculated herein that bleaching with oxidants at a high pH, i.e., in excess of about 9, causes the lignin portion of the cell wall to degrade. This degradation causes the ferulic acid (which may be present in reduced amounts as compared with native bran) to become more available, i.e., the anti-oxidant activity is increased. In one embodiment, the anti-oxidant activity in the bleached bran is increased by at least 15 to 20%, up to 30–35% or more, as compared with unbleached bran, depending on bleaching conditions. This increase in activity occurs even though other antioxidant components, such as vanillic acids and certain other phenolic acids, such as caffeic acid, are oxidized and no longer available. The increase in activity of the ferulic acid, however, is sufficient to offset this loss, causing the net increase in anti-oxidant activity as noted above.

The increased anti-oxidant activity carries over into the blended product, i.e., such as a composite flour. The activity does decrease over time, depending on storage conditions, such as temperature, etc. However, any increased antioxidant activity may have a beneficial or modulating effect on consumer health. Some medical studies suggest that whole wheat flour may have a modulating effect in preventing certain health conditions such as colon cancer.

The water absorption of the bleached bran is also improved, as it is increased by up to six times in comparison to unbleached bran. Specifically, the bleaching treatment removes part of the lignocellulosic and hemicellulose material of the cell walls. As a result, the cell wall structure is disrupted with a concomitant increase in the water holding capacity of the treated material. Increased water absorption in the bran improves water absorption in any composite flour using the bran, which provides increased consistency and predictability in baked goods, as well as increasing yield. When added to regular or white flour, the whole wheat or bleached bran enriched flour also beneficially exhibits improvements in water absorption. Such increased water absorption of the flour is a great benefit in baking applications involving variations in water addition due to equipment or operator error.

The moisture content of the bleached bran, on a "fresh" or "as is" basis, is between about four (4) to 12%. On a dry basis, the range is about 4.2 to 13.6%.

The resulting bran also has an improved taste as compared with untreated bran. The improvement in taste is significant enough to be noticeable by most consumers. In one embodiment, a consumer panel rated a bread product containing bleached bran made according to the present invention, i.e., a "white" whole wheat product, at least 50% improved in taste as compared with conventional whole wheat bread. This taste improvement is likely because the flavor components, including phenolic compounds, such as caffeic acid, tannins, coumaric acid, and so forth, as well as other polyphenolic compounds have been sufficiently removed or modified so as to reduce the associated bitter tastes to acceptable levels. By using the bleaching processes of the present invention, the bitter flavor components present in the native bran are reduced, although the precise percentage of reduction associated with the noticeable flavor improvement has not yet been determined.

Although the use of bleached bran may have some detrimental effects on dough mixing and stability characteristics as compared with unbleached bran, such effects can be overcome through various recipe modifications. For example, the mixing process can be altered by increasing the water added to the dough, such as by about two (2) to 10 percent and/or increasing the mixing time until the gluten network is optimized, as is understood by those skilled in the art. Alternately, or in addition, various additives, such as vital gluten, emulsifiers, and so forth, can be used to yield baked products similar in performance to those manufactured with white wheat.

The bleached bran product of the present invention is an intermediate product that can be recombined with flours to produce an essentially "white" whole wheat flour having a fiber content comparable to conventional whole wheat flours, i.e., about 10 to 12%. Essentially, the white appearance and flavor identity of the resulting composite flour is not altered by addition of the bleached bran. In one embodiment, the flour is a "whole grain" flour, such that the fiber content is at least about 5.5 g of dietary fiber per 100 g of flour. The fat content of the composite flour can vary from about one (1) to three (3)%. However, the fat content can be adjusted, as needed, such as with the addition of germ to the fiber. In one embodiment, the fat content of the composite flour is about two (2)%.

The flours can be of various types, such as bread flour (e.g., from hard wheat), all-purpose flour used in a variety of baked goods, including breads, cakes, muffins, and so forth, pastry flour (soft wheat) or durum flour. In one embodiment, the bran is recombined with durum flour, to produce pasta. In this embodiment, the yellow color of the pasta, considered an attribute of quality, can also be increased, if desired, by blending it with semolina. Yellowing can also be controlled by temperature and pH, i.e., higher pH produces a more yellow product.

In one embodiment, the bran is sold as a bran ingredient, put into dry mixes, added to ready-to-eat cereals, refrigerated uncooked or bakeable doughs, cooked cereal dough, and so forth. Use of bran in ready-to-eat cereals increases the dietary fiber content and the antioxidant activity of the cereal. In one embodiment, the bran is admixed with sugar, leavening agents (e.g., baking soda, baking powder, etc.) and salt. In another embodiment, the bran is combined with soy to produce various soy products, such as meat-substitute products. In one embodiment, the invention comprises any of the above named end products.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A bleached bran product comprising bleached bran derived from a cereal grain, the bleached bran product produced by treating bran with a hydrogen peroxide solution and an aqueous alkaline solution in a wet bleaching process, followed by an ozone treatment, the bleached bran product having an antioxidant activity at least 15 to 35% higher than native bran and suitable for admixing with whole wheat flour to produce white whole wheat flour having an L value on the Hunter scale of at least about 82.

2. The bleached bran product of claim 1 wherein the bran is treated with about 0.1 to 2% ozone, by weight, at a pH of about 4 to 5.

3. The bleached bran product of claim 2 wherein the reaction of ozone and bran is in the range of about 90 to 95%.

4. The bleached bran product of claim 1 wherein bitter flavor components present in the native bran are reduced.

* * * * *

UNITED STATES PATENT AND TRADEMARK OFFICE
CERTIFICATE OF CORRECTION

| | | |
|---|---|---|
| PATENT NO. | : 6,899,907 B1 | Page 1 of 1 |
| APPLICATION NO. | : 09/663914 | |
| DATED | : May 31, 2005 | |
| INVENTOR(S) | : Monsalve-Gonzalez et al. | |

It is certified that error appears in the above-identified patent and that said Letters Patent is hereby corrected as shown below:

On Title Page, Item (75) should read,

Inventors:    Adelmo Monsalve-Gonzalez,
Plymouth, MN (US)
Mayur Subhash Valanju,
Brookfield, WI (US)
John G. Roufs,
Maple Grove, MN (US)

Signed and Sealed this

Third Day of April, 2007

JON W. DUDAS
*Director of the United States Patent and Trademark Office*